United States Patent [19]
Gifford

[11] 3,727,629
[45] Apr. 17, 1973

[54] VACUUM CHECK VALVE
[75] Inventor: Robert T. Gifford, Yellow Springs, Ohio
[73] Assignee: Vernay Laboratories, Inc., Yellow Springs, Ohio
[22] Filed: Dec. 27, 1971
[21] Appl. No.: 212,409

[52] U.S. Cl. ................. 137/205, 137/202, 251/333
[51] Int. Cl. ............................................. F16k 31/22
[58] Field of Search ................. 137/205, 202, 433; 251/333

[56] References Cited
UNITED STATES PATENTS

| | | | |
|---|---|---|---|
| 2,661,886 | 12/1953 | Speer | 137/205 X |
| 3,280,858 | 10/1966 | Paulson | 137/205 X |
| 3,152,604 | 10/1964 | Frye | 137/202 |
| 3,056,575 | 10/1962 | Mooney | 251/333 X |

*Primary Examiner*—Alan Cohan
*Attorney*—Lawrence B. Biebel et al.

[57] ABSTRACT

A check valve particularly adapted for use in conjunction with surgical drainage or suction apparatus for operative and postoperative drainage of body cavities. The valve includes a sleeve in which a bouyant float valve having a generally conically shaped upper end is positioned. A thin, flexible diaphragm is mounted in the upper end of the sleeve and has a suction opening through its center. When the level of drained fluid in the collecting vessel rises sufficiently the float valve is lifted upwardly and its generally conically shaped upper end is received in the suction opening through the diaphragm to prevent liquid from entering the suction line. The conical shape of the valve upper end enhances the creation of a low pressure area adjacent the suction opening as the valve moves into proximity to the diaphragm which causes the valve to snap into position during the last portion of its travel. Because of the thin resilient nature of the diaphragm, it is distorted when the valve snaps home, positively gripping and retaining the valve in sealing engagement even after termination of suction.

14 Claims, 7 Drawing Figures

PATENTED APR 17 1973 3,727,629
SHEET 1 OF 2
FIG-1
FIG-2
FIG-3
FIG-4
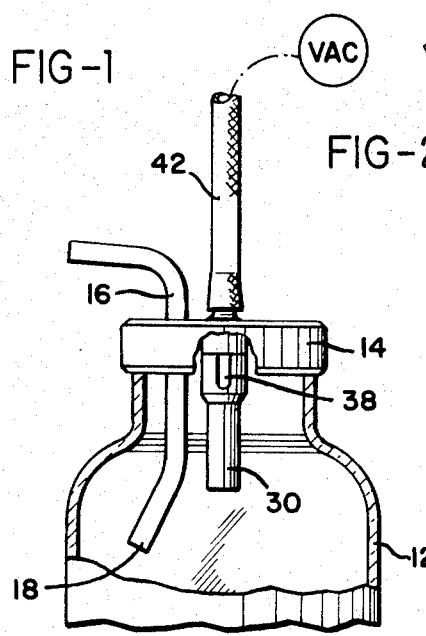
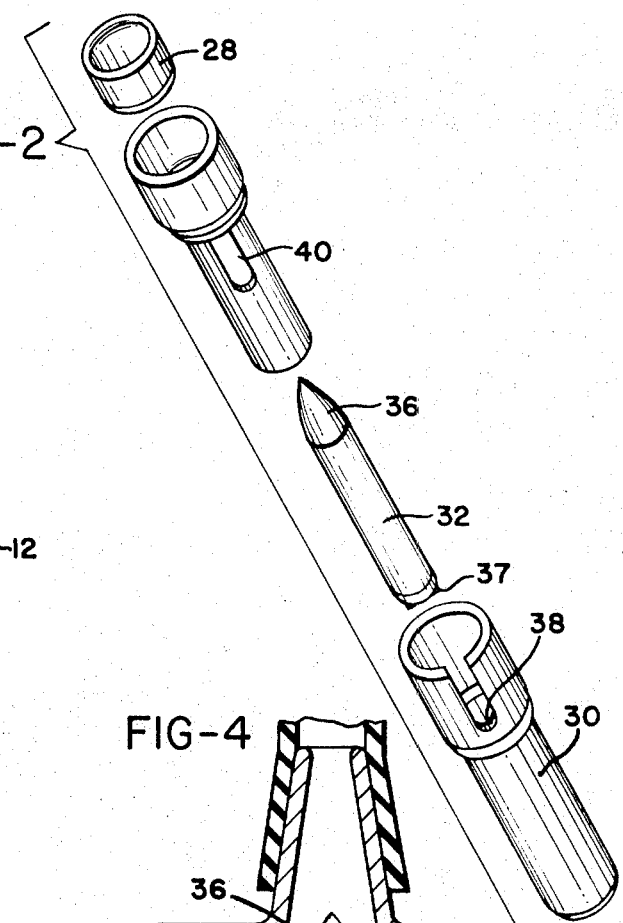
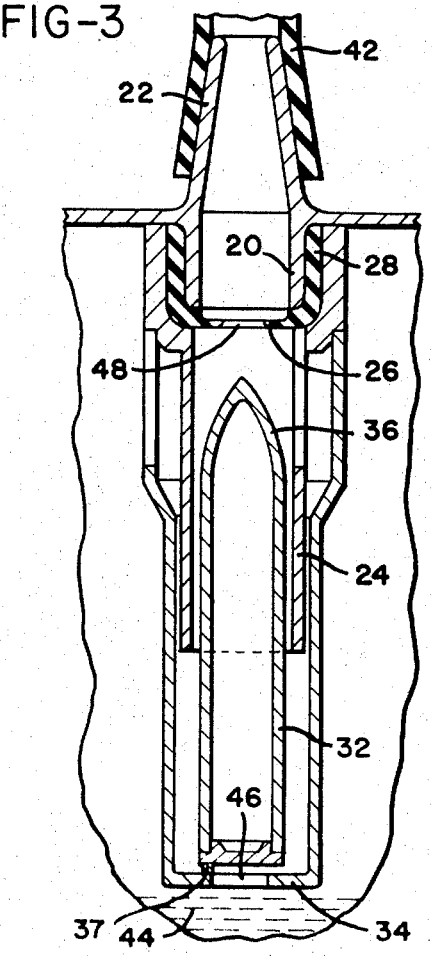
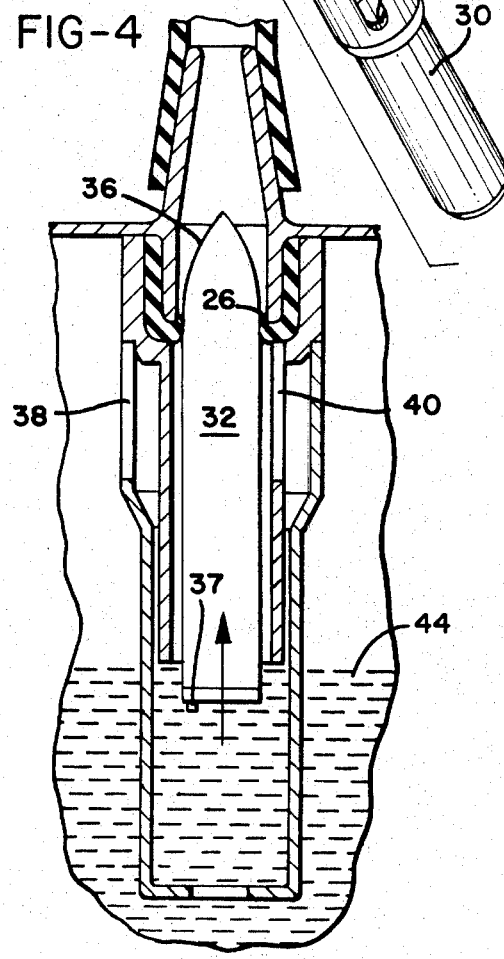

VACUUM CHECK VALVE

BACKGROUND OF THE INVENTION

It is frequently necessary as part of operative or postoperative procedures to provide means for draining body cavities of liquids which tend to collect therein. U.S. Pat. No. 2,939,460 discloses apparatus for this purpose and, as is typical in apparatus of this type, a collection jar is utilized having a suction line leading thereinto for sucking liquid from the body cavities and a vacuum line connected to a suitable vacuum pump for creating a negative pressure within the jar and causing liquid to be sucked into the jar. A float valve is associated with the end of the vacuum line attached to the jar so that when the liquid contents of the jar reach a predetermined level the suction line is shut off from the interior of the jar to prevent the entry of liquid thereinto.

Another example of apparatus of this type is shown in U.S. Pat. 2,429,313 wherein the end of a vacuum line attached to a collecting jar is provided with a float valve designed to close off the end of the vacuum line when the liquid level in the jar rises to some predetermined level.

SUMMARY OF THE INVENTION

The present invention provides a vacuum check valve of relatively simple construction which prevents liquids from entering the vacuum system and further, provides a positive seal to prevent the accidental spilling of liquid from a collecting jar after the jar is disconnected from its vacuum source.

The valve includes a hollow sleeve member having a diaphragm extending across its upper end with a suction opening formed through the center of the diaphragm. A collar is formed integrally with the diaphragm and extends upwardly therefrom along the inner wall of the sleeve to serve as packing between the sleeve and an inwardly projecting connector associated with a cover for the jar.

A bouyant float valve having a generally concially shaped upper end is provided in the sleeve, freely movable therein so that when the liquid level in the collection jar reaches some predetermined level the upper end of the float valve will move into proximity with the valve seat formed by the thin flexible diaphragm.

Because of the concial shape of the valve upper end, a Venturi effect is created which causes the valve to snap into position as it nears the valve seat. As it does so the thin flexible diaphragm is distorted about the end of the float valve, positively gripping it and holding it in position even after suction through the vacuum line has terminated.

Therefore, when the collection jar has filled to the desired level the vacuum line may be disconnected from the jar and the jar transported for disposal with a minimal risk of leakage of the contents thereof through the valve assembly.

In one embodiment of the invention a shroud is provided which extends downwardly from the upper end of the sleeve in concentric relationship thereto. The shroud is provided with an opening therethrough offset with respect to an opening through the wall of the sleeve. In this way liquid splashing into the jar cannot accidentally enter the sleeve upstream of the float valve upper end and be drawn into the vacuum line. Additionally, the upper end of the bouyant float may be provided with a shoulder to limit upward movement of the valve in the sleeve.

BRIEF DESCRIPTION OF THE DRAWINGS

FIG. 1 is an elevational view of a collection jar and associated structure in accordance with the present invention with portions broken away for clarity;

FIG. 2 is an exploded perspective view of a valve assembly in accordance with the present invention;

FIG. 3 is a cross-sectional view showing the valve assembly attached to a connector on the collection jar;

FIG. 4 is a view similar to FIG. 3 but showing the valve in its closed position;

DESCRIPTION OF THE PREFERRED EMBODIMENTS

Figure 5:
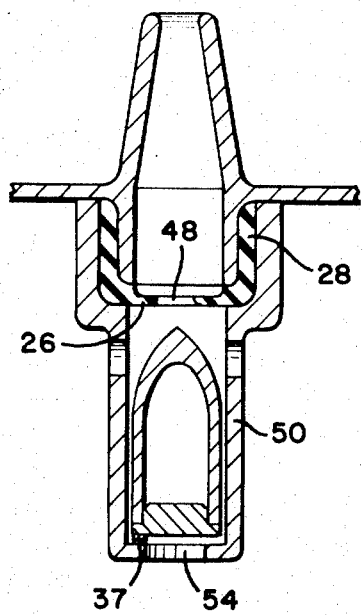
FIG. 5 is a view of a second preferred embodiment of the invention.

As seen in FIGS. 1, 3 and 4 of the drawings, an assembly 10 in accordance with the present invention will include a collection jar 12 having a lid or cap 14 therefor through which a liquid line 16 extends, having its lower end 18 terminating within the jar. Formed integrally with the cap 14 is an inner, integrally projecting connector 20 and an outer, upwardly projecting connector 22 of tapered configuration.

Figure 7:
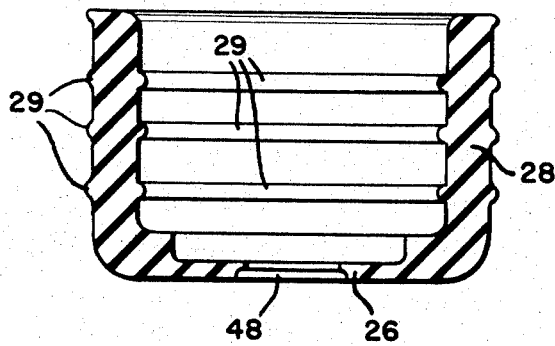
FIG. 7 is a cross-sectional view through the combined diaphragm and packing member of the present invention.

An elongated hollow sleeve 24 has a diaphragm 26 mounted in its upper end. The diaphragm is constructed of a resilient material, such as rubber, and has formed integrally therewith a collar-like portion 28 which extends upwardly from the diaphragm along the wall of the sleeve and serves as packing between the connector 20 and the sleeve 24. It will also be noted from FIG. 7 of the drawings that the collar 28 may be provided with a series of beads 29 extending circumferentially around the inner and outer surfaces of the collar 28 to allow some tolerance between elements engaged by the collar and provide a better seal and gripping action. Where the elements between which the collar 28 is interposed fit closely the beads 29 will be compressed to the point that their presence is not visually apparent, as in FIGS. 3, 4 and 5.

In the embodiment of the invention shown in FIGS. 1 through 4 of the drawings, a shroud 30 is positioned around the sleeve 24 in concentric relationship thereto. A bouyant float valve 32 is received in the sleeve 24 and is freely movable longitudinally thereof but is confined in the sleeve by the lower end 34 of the shroud.

The upper end 36 of the valve is generally conical in configuration while its lower end is sealed to provide the desired bouyancy. By generally conical is meant a substantially parabolic shape, as shown, as well as a straight sided conical shape. It will also be noted that the lower end of the float is provided with means, such as the bar 37, to prevent opposing flat surfaces of the lower end of the float and shroud from sticking to each other when wet.

The shroud is provided with an elongated opening 38 through an upper end of its wall, displaced or offset with respect to a similar opening 40 formed in the wall of the sleeve 24. For purposes of illustration the openings 38 and 40 are shown as aligned in FIG. 2 of the drawings, although they are preferably offset as seen in FIGS. 3 and 4 of the drawings.

With the above construction vacuum applied to the interior of the jar 12 through the line 42 will cause liquid to be drawn through the line 16, one end of the line 16 being in communication with a body cavity which it is designed to drain, and the liquid will pass through the lower end 18 of line 16 into the jar 12.

As the level of liquid 44 rises in the jar it will enter the sleeve through the opening 46 in the bottom of the shroud, causing the bouyant float valve 32 to be lifted upwardly towards the diaphragm 26. As it is moved into proximity to the diaphragm 26 the increased negative pressure created adjacent the area of the suction opening 48 through the diaphragm will cause the float valve to rapidly snap into the position shown in FIG. 4 of the drawings.

In this position the thin flexible diaphragm is distorted about the upper end of the valve, positively gripping the valve and holding it in position. This shuts off the vacuum line from the interior of the jar and prevents the flow of liquid into the vacuum line. Additionally, the jar may thereafter be transported to a disposal point without fear of spilling, since the float valve is locked in position by the distortion of the thin flexible diaphragm.

It will also be noted that by forming the collar 28 integrally with the diaphragm 26, the valve assembly may be readily attached to the jar connector 20, with the collar portion 28 serving as packing between the upper end of the sleeve and the connector. Additionally, by utilizing a shroud having openings therethrough, offset with respect to a similar opening through the sleeve, air may be evacuated from the jar without the danger of splashing liquid entering the vacuum system.

Turning now to FIG. 5 of the drawings, a second preferred embodiment of the invention will be described. In the embodiment shown in FIG. 5 of the drawings the construction of the valve is simplified by eliminating the use of a protective shroud. Instead, the sleeve 50 terminates at its lower end in a horizontal portion 52 having an opening 54 therethrough which functions in the same manner as the portion 34 of the shroud and the opening 46 therethrough.

Openings 56 in the upper end of the sleeve member permit the evacuation of air from the jar through the suction opening 48 in the diaphragm 26, which is the same in all respects as the diaphragm described above in connection with the embodiment shown in FIGS. 1 through 4 of the drawings. While the construction of FIG. 5 does not provide the safeguard against splashing fluid entering into the system, it will be seen that this latter construction provides some simplification of the valve design.

Figure 6:
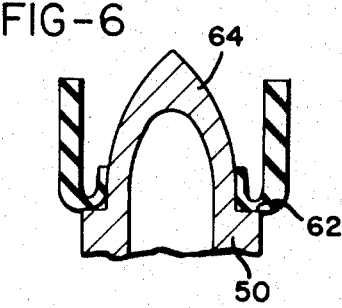
FIG. 6 shows a modification of the bouyant float valve.

FIG. 6 of the drawings shows an additional modification, wherein the upper end of a valve member 60 is provided with a shoulder 62 adjacent its upper end. With this construction, entrance of the upper end 64 of the float valve is positively limited by engagement of the shoulder 62 with the diaphragm.

From the above it will be seen that the present invention provides an integral valve assembly which includes a combination packing member and valve seat and one in which a positive seal is provided even after disconnection of the vacuum source therefrom.

While the forms of apparatus herein described constitute preferred embodiments of the invention, it is to be understood that the invention is not limited to these precise forms of apparatus, and that changes may be made therein without departing from the scope of the invention.

What is claimed is:

1. A vacuum check valve assembly comprising:
   a. an elongated hollow sleeve having upper and lower ends,
   b. a thin flexible diaphragm mounted in and extending across said upper end of said sleeve,
   c. means defining a suction opening through said diaphragm medially thereof for sucking fluid therethrough,
   d. a bouyant float valve positioned in said sleeve and movable longitudinally thereof, bouyant
   e. said float valve having an upper end receivable in said suction opening, and
   f. said diaphragm having a thickness and elasticity such that said diaphragm distorts and positively grips said bouyant float valve when said upper end thereof is received in said suction opening.
2. The assembly of claim 1 wherein:
   a. said upper end of said bouyant float valve is generally conical in configuration.
3. The assembly of claim 1 further comprising:
   a. a collar formed integrally with said diaphragm and extending upwardly therefrom along an inner surface of said sleeve and providing packing means for said assembly.
4. The assembly of claim 3 further comprising:
   a. a plurality of circumferentially extending beads on inner and outer surfaces of said collar.
5. The assembly of claim 1 further comprising:
   a. a substantially cylindrically shaped shroud extending about said sleeve.
6. The assembly of claim 5 further comprising:
   a. means on said shroud for confining said float valve within said sleeve.
7. The assembly of claim 5 further comprising:
   a. means for admitting fluid into said sleeve, and
   b. means for admitting fluid into said shroud offset with respect to said fluid admitting means in said sleeve.
8. A vacuum check valve assembly comprising:
   a. a liquid collection vessel,
   b. a liquid line communicating with the interior of said vessel,
   c. an internally projecting connector mounted adjacent an upper end of said vessel,
   d. means for applying a vacuum to the interior of said vessel through said connector,
   e. an elongated hollow sleeve having upper and lower ends,
   f. said upper end of said sleeve receiving said inwardly projecting connector,
   g. a thin flexible diaphragm extending across said sleeve adjacent said upper end thereof,
   h. means defining a suction opening through said diaphragm medially thereof,
   i. a bouyant float valve positioned in said sleeve and movable therein longitudinally thereof, j. said float valve having an upper end receivable in said suction opening, and k. said diaphragm having a thickness and elasticity such that said diaphragm distorts and positively grips said bouyant float valve upper end when said upper end is lifted into engagement therewith.

9. The assembly of claim 8 wherein:

a. said upper end of said bouyant float valve is generally conical in configuration.

10. The assembly of claim 8 further comprising:

a. a collar formed integrally with said diaphragm and extending upwardly therefrom between said internally projecting connector and said upper end of said sleeve to provide a seal therebetween.

11. The assembly of claim 10 further comprising:

a. a plurality of circumferentially extending bead on inner and outer surfaces of said collar.

12. The assembly of claim 8 further comprising:

a. a substantially cylindrically shaped shroud extending about said sleeve.

13. The assembly of claim 12 further comprising:

a. means on said shroud for confining said float valve within said sleeve, and b. means for admitting liquid in said vessel into said shroud to lift said valve upwardly in said sleeve when the liquid level in said vessel reached a predetermined level.

14. The assembly of claim 12 further comprising:

a. means defining a fluid opening through said shroud adjacent an upper end thereof, and b. means defining a fluid opening through said sleeve adjacent an upper end thereof and offset with respect to said opening in said shroud.

* * * * *